US005499666A

United States Patent [19]

Foster et al.

[11] Patent Number: 5,499,666

[45] Date of Patent: Mar. 19, 1996

[54] SANITARY MEAT PURGE ELIMINATOR

[75] Inventors: Robert C. Foster, Coeur d'Alene; Guy D. Forbes, Post Falls, both of Id.

[73] Assignee: F & F Enterprises, Inc., Coeur d'Alene, Id.

[21] Appl. No.: 312,651

[22] Filed: Sep. 27, 1994

[51] Int. Cl.$^6$ .................................................. A22C 17/00

[52] U.S. Cl. .......................... 141/98; 141/331; 141/332; 269/54.4; 269/296; 269/302.1; 452/194; 452/198

[58] Field of Search .............................. 141/98, 106, 331, 141/332, 333, 339–342, 364; 269/54.4, 296, 302.1; 452/194, 196, 198; 220/570–573

[56] References Cited

U.S. PATENT DOCUMENTS

| | | | |
|---|---|---|---|
| 205,128 | 6/1878 | Ortlip | 452/196 |
| 272,415 | 2/1883 | Crapon et al. | 141/333 |
| D. 308,002 | 5/1990 | Dohrmann | D7/700 |
| D. 342,531 | 12/1993 | Commander et al. | D15/150 |
| 483,664 | 10/1892 | Aborn | 141/332 X |
| 508,885 | 11/1893 | Johnston | 269/296 X |
| 950,552 | 3/1910 | Milholland et al. | 141/331 X |
| 1,134,837 | 4/1915 | Fox | 141/331 |
| 1,222,390 | 4/1917 | Gorham et al. . | |
| 1,238,013 | 8/1917 | Harper | 141/331 |
| 1,471,122 | 10/1923 | Greaves | 269/54.5 |
| 2,467,949 | 4/1949 | Thomas | 141/331 |
| 2,902,062 | 9/1959 | Smekal | 141/331 X |
| 5,018,559 | 5/1991 | Branan | 141/339 |
| 5,117,878 | 6/1992 | Shaw et al. | 141/333 |
| 5,143,178 | 9/1992 | Latham, Jr. | 184/106 |
| 5,172,739 | 12/1992 | Ristroph | 141/98 |
| 5,219,006 | 6/1993 | Bishop | 141/1 |
| 5,363,755 | 11/1994 | Liang | 269/302.1 X |

FOREIGN PATENT DOCUMENTS

| | | | |
|---|---|---|---|
| 2579074 | 9/1986 | France | 452/194 |
| 0084027 | 8/1954 | Norway | 141/331 |

*Primary Examiner*—J. Casimer Jacyna
*Attorney, Agent, or Firm*—Wells, St. John, Roberts, Gregory & Matkin

[57] ABSTRACT

A sanitary meat purge eliminator includes a circular upright wall that loosely fits within the opening of a supporting barrel and an outwardly protruding ledge that supports the device on the barrel top. A transverse wall extending across the upright wall includes a perforated section designed to support prepackaged meat and an adjacent discharge opening. The perforated section and discharge opening are separated by an upright divider.

15 Claims, 4 Drawing Sheets

SANITARY MEAT PURGE ELIMINATOR

TECHNICAL FIELD

This invention relates to waste transfer devices for supporting objects above an open container and providing access to the interior of the refuse container to facilitate drainage of liquids and disposal of solids associated with the objects. More specifically, it pertains to a sanitary meat purge eliminator for facilitating the handling of prepackaged meat and waste products removed from such meat.

BACKGROUND OF THE INVENTION

The present invention arose in response to the difficulties now commonly encountered in handling prepackaged meat as it is prepared for the consumer at the retail or supermarket level. In contrast to earlier times when partial or complete animal carcasses were handled in the meat industry at the retail level, it has become standard in the meat distribution industry to prepackage primary cuts of meat at a central packing house. The primary cuts are wrapped in plastic bags, which can be either sealed or unsealed. These primary cuts are then shipped to supermarkets and other retail meat distributors in prepackaged condition.

Before the primary cuts can be further trimmed for consumer sale or packaging, it is necessary to open the prepackaged meat and dispose of the package and its unwanted contents. This is a messy and often unsanitary procedure, since the bag inevitably contains liquid purge in the form of blood. Not only must the meat be drained of all unwanted liquid, but the liquid-impervious bag, which is wet, requires sanitary disposal. Up to this point, the procedure of opening prepackaged meats has typically involved liquid spillage on countertops, cutting blocks, and adjacent floor surfaces.

Discarded fat, trim, meat, and packaging materials in retail meat cutting operations are typically stored and removed within open barrels. In addition, prepackaged meat has been handled while resting upon a supporting screen placed over an open barrel. While such a screen does permit drainage of purge and other liquids from the meat and into the supporting barrel, there is no provision made for depositing solid waste materials, such as wrappings and meat trim, into the barrel. These solid materials must either be discharged into an adjacent barrel or the screen must be lifted to permit their entry into the barrel supporting the meat. In both situations, there is substantial cause for concern about contamination of the meat, the handling personnel, and the adjacent work surfaces.

The present invention has been developed specifically to provide an efficient and sanitary solution to the problem of opening and initially handling prepackaged meats. However, the resulting device is applicable to other object handling situations involving waste liquids and/or solids associated with the objects.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

Figure 1:
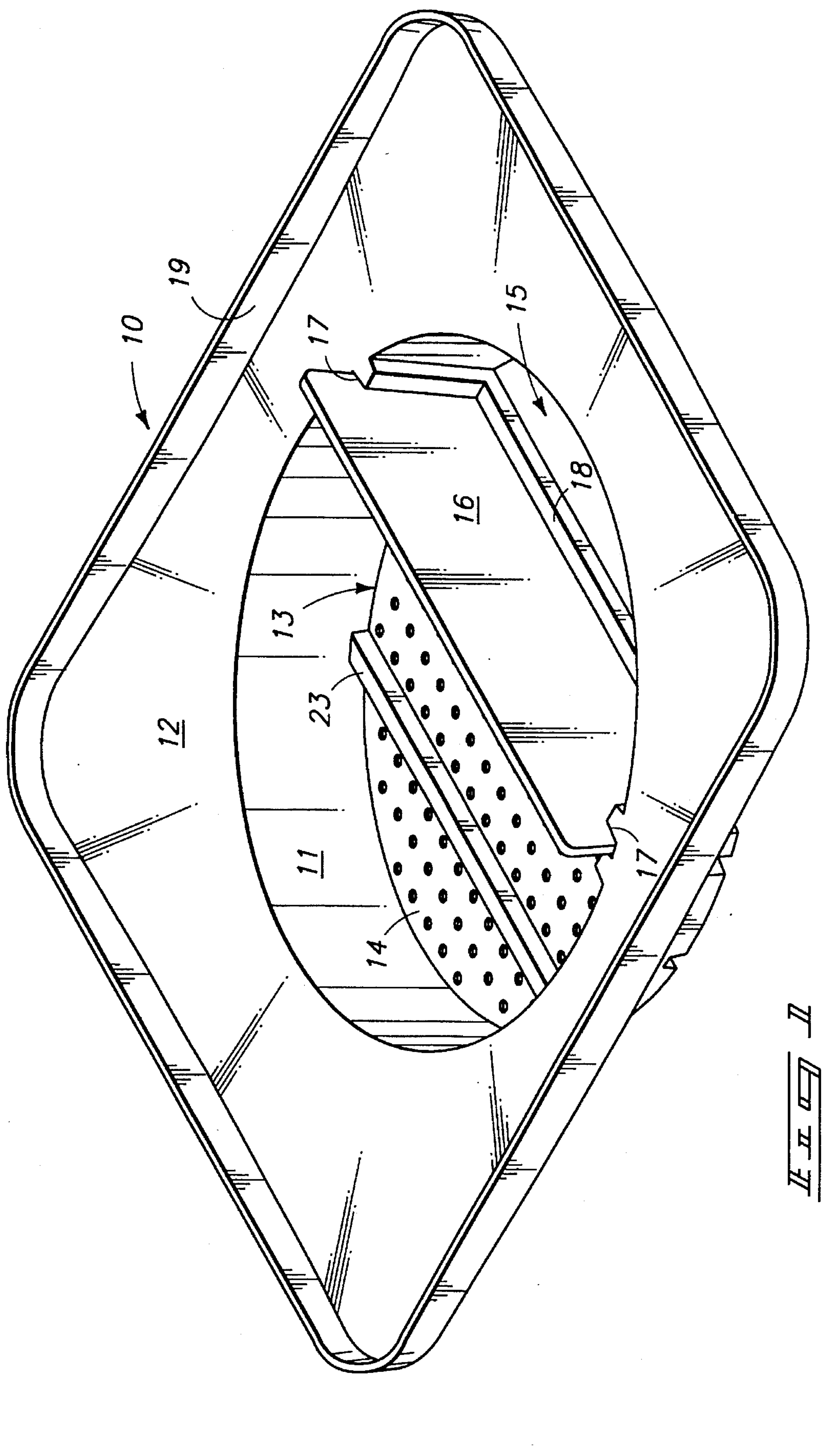
FIG. 1 is a top perspective view of the assembled device.
Figure 2:
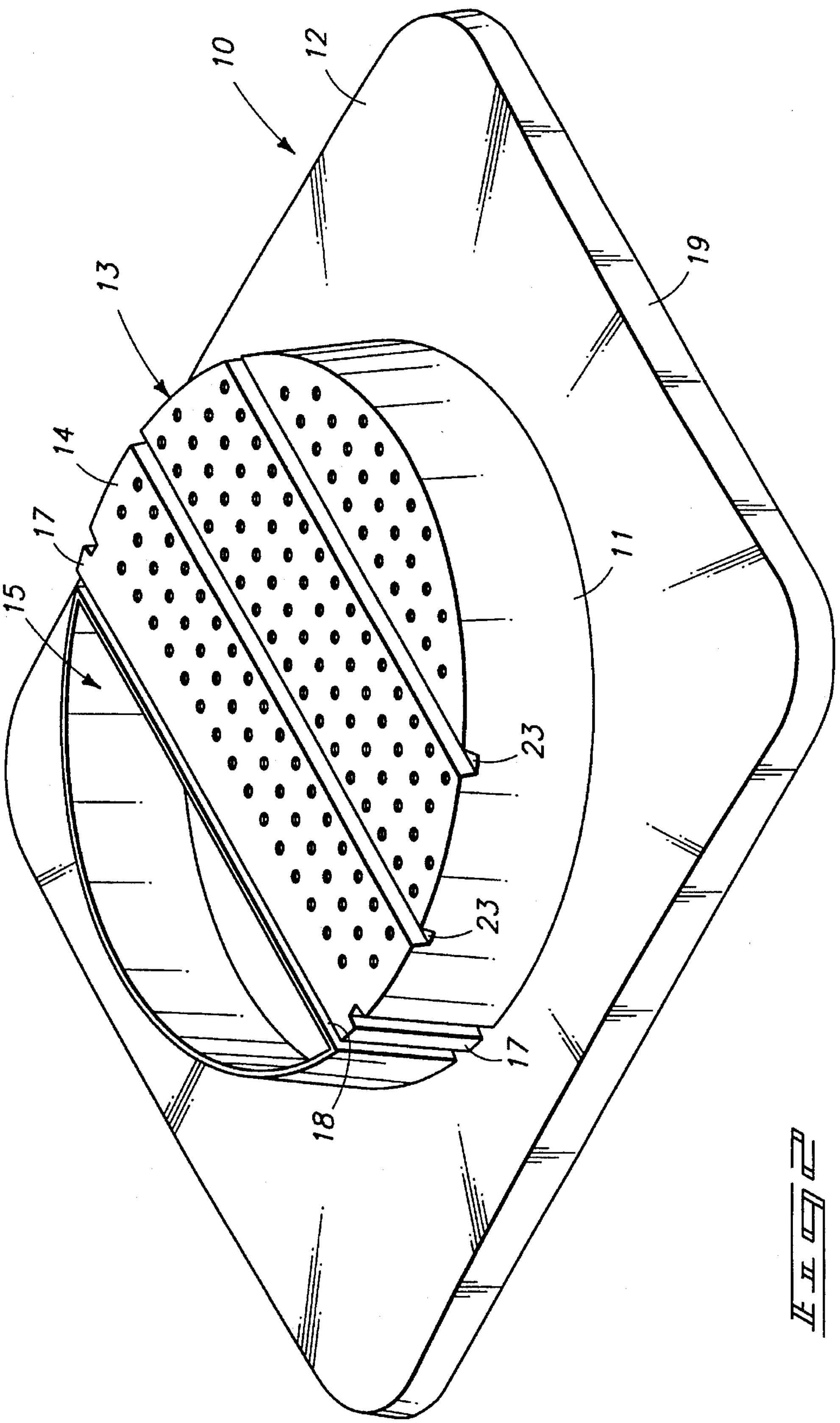
FIG. 2 is a bottom perspective view.
Figure 3:
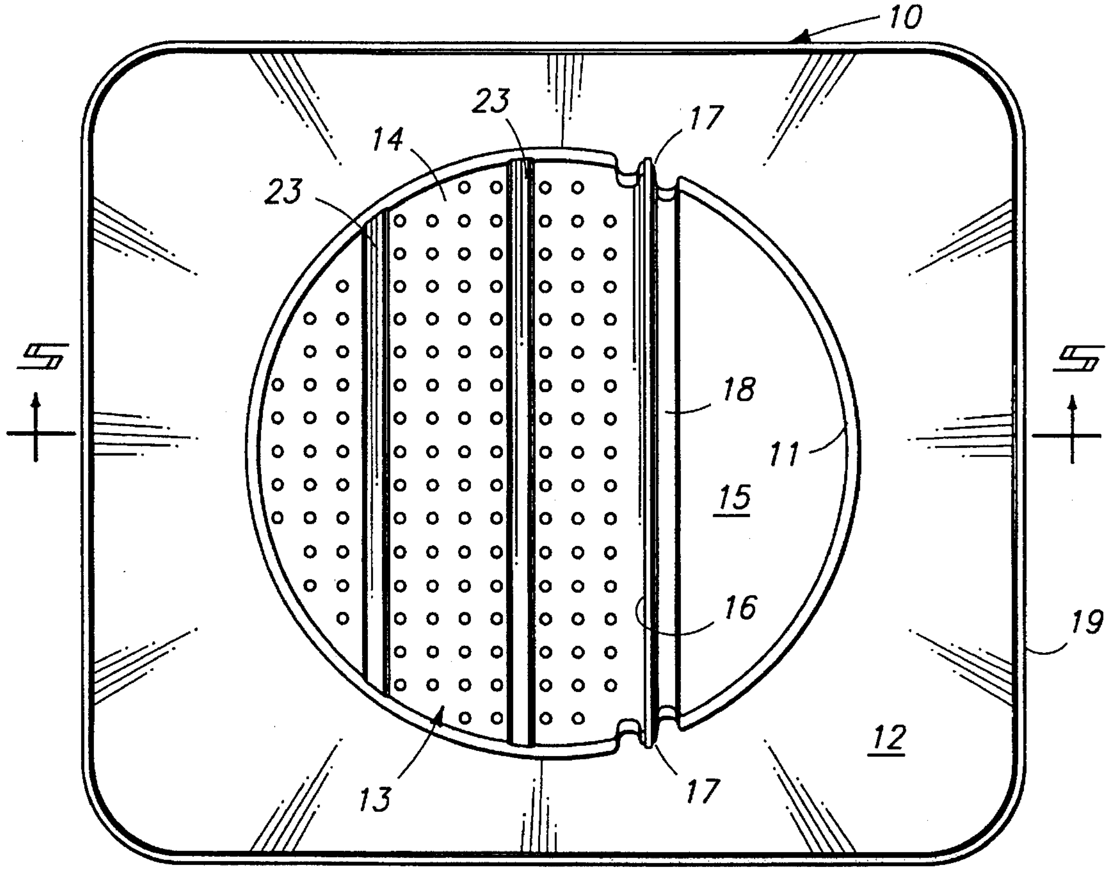
FIG. 3 is a top plan view.

This disclosure of the invention is submitted in furtherance of the constitutional purposes of the U.S. Patent Laws "to promote the progress of science and useful arts" (Article 1, Section 8).

The device illustrated in the drawings was designed specifically for use in facilitating the initial handling and preparation of prepackaged meat being prepared for the consumer. It is more generally adaptable to the support of any object over the top of an open container while providing access to the interior of the container to accommodate drainage of liquids and disposal of solids associated with the object as it is being manually handled.

The following description will relate specifically to the intended purpose of the device for handling prepackaged meat, but is not to be limited to this or any other specific commercial field of application.

The waste transfer device 10 illustrated specifically in the drawings is formed about an upright wall structure 11. The wall structure 11 is illustrated as a continuous circular wall of solid construction. However, it need not be solid or continuous, it can alternately be discontinuous or skeletal. The circular upright wall structure 11 as illustrated includes parallel upper and lower circular edges. The outer transverse dimensions of the wall structure 11 should be sized to fit into an opening across the top of an upright open container with which it is to be used.

This disclosure of the upright wall structure 11 is not to be limited to circular wall configurations, since this circular shape has been selected as being complementary to the typical circular interior shape of waste drums or barrels used in the meat cutting industry. Obviously, the transverse configuration of the wall structure 11 can match the size and shape of the supporting opening on any associated waste container.

The wall structure 11 is vertically tapered, having a reduced diameter at its lower edge. This facilitates initial mounting of the device 10 and insertion of wall structure 11 into a receiving container. It also facilitates the formation of the device 10 by conventional molding process when it is to be constructed from structural plastic material, as illustrated.

A substantially horizontal surrounding ledge 12 protrudes outwardly from the upright wall structure 11. As illustrated, ledge 12 protrudes transversely outward from the upper circular edge of the upright wall structure 11. Ledge 12 is designed to rest upon the top of a related container while locating the upright wall structure 11 within the upper opening of the container (see FIG. 5).

The illustrated ledge 12 has a substantially rectangular shape when viewed from above the device 10. This particular shape provides sufficient surface area to serve as a useful upwardly facing support surface surrounding the circular wall structure 11. Tools and other objects can temporarily be placed about ledge 12 during use of the device. However, the peripheral shape of ledge 12 is not critical to an understanding of this device. It can alternatively be circular, oval or any other desired geometric shape.

Figure 4:
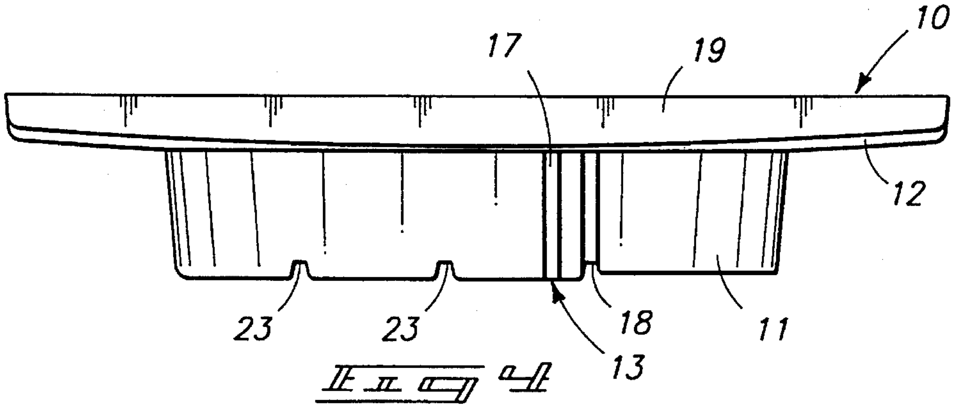
FIG. 4 is a side elevation view.
Figure 5:
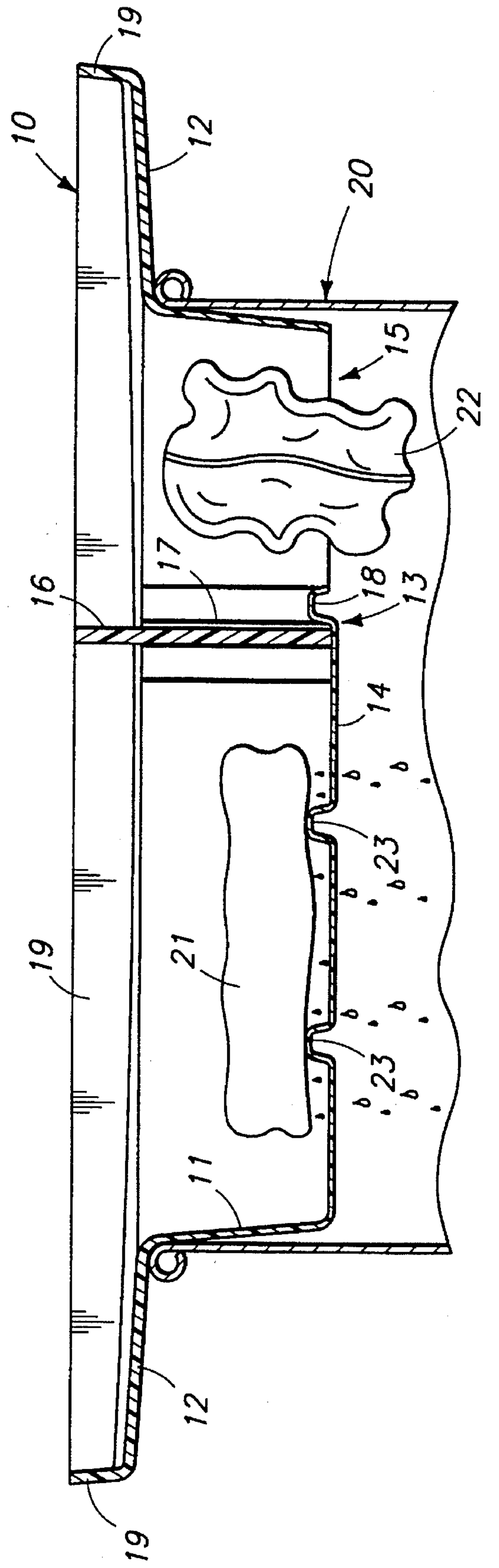
FIG. 5 is an enlarged sectional view taken along line 5—5 in FIG. 3, illustrating the manner in which the device is supported on an open container.

The upper surface of ledge 12 is dished inwardly toward the upright wall structure 11 (see FIGS. 4 and 5). The slight concave nature of the upper surface across ledge 12 facilitates drainage of liquid into the center of the device 10.

Ledge 12 is completed by an upwardly extending flange 19 extending continuously about its periphery. The flange 19 prevents outward spillage and splashing of liquid materials that might otherwise run off the outer edge of ledge 12 during use of the device 10.

The space within the upright wall structure 11 is spanned across the lower circular edges of the upright wall structure 11 by a transverse wall generally designated at 13. The transverse wall 13, which is recessed and elevationally lower than ledge 12, includes a perforated section 14 partially bounded by the lower circular edge of the upright wall structure 11. The transverse wall 13 also includes a discharge opening 15 directly adjacent to the perforated section 14. Discharge opening 15 is also partially bounded by the lower circular edge of upright wall structure 11.

The perforated section 14 provides support for objects, such as prepackaged meat, while permitting drainage of liquids associated with the objects into the interior of a supporting container. The larger discharge opening 15 is provided to direct discarded solids, such as packaging and solid trim, into the interior of a container.

The illustrated form of the waste transfer device 10 includes upwardly projecting transverse ribs 23 which are arranged parallel to the divider 16. The ribs 23 provide stiffness to the transverse wall 13. They also assist in supporting solid objects, such as meat, in a position elevationally spaced slightly above the elevation of the upper surface across the perforated section 14. This facilitates drainage of liquids from such objects.

As can be seen in the drawings, an upright divider 16 is interposed between the perforated section 14 and the discharge opening 15 of the transverse wall 13. The upright divider 16 is preferably solid and extends upwardly from the transverse wall 13 and across the upright wall structure 11 at a position located between the perforated section 14 and the discharge opening 15. Divider 16 has an upper edge that is coplanar with the upper edge of flange 19. It provides a solid barrier to separate objects resting on the perforated section 14 from the opening 15 leading directly to the interior of a supporting container.

In the illustrated embodiment, the upright divider 17 is a planar solid wall constructed separately from the remainder of the waste transfer device 10. It is supported in recessed slots 17 extending upwardly along opposed portions of upright wall structure 11. In addition, a lateral rib 18 is formed across the transverse wall 13 to provide lateral support for the bottom edge of divider 16. The rib 18 assures against the bottom edge of divider 16 yielding and forming an open gap leading from the perforated section 14 to the discharge opening 15.

Producing the divider 16 as a separate element of the device 10 facilitates cleaning of the surfaces about the upright wall structure 11 and transverse wall 13, as well as the surfaces of the divider 16 itself.

As can be seen in FIG. 5, the waste transfer device 10 simply rests across the top opening of a supporting container 20, such as a metal storage drum or barrel. The supporting container can also be provided with lower wheels (not shown) to facilitate movement of the waste transfer device 10 about a work area.

FIG. 5 graphically illustrates support of meat 21 on the perforated section 14 of the device 10. Blood and other liquid purge from the meat will drip gravitationally through the openings provided about the perforated section 14 of transverse wall 13. In the case of prepackaged meat, the wrapper 22 can be removed from the meat while at least partially supported on the perforated section 14, allowing any released liquid to flow into the supporting container. The separated wrapper or bag can then be directed over divider 16 and downwardly through the discharge opening 15 formed within lower transverse wall 13.

Fat and other unwanted trim can be quickly removed from the meat as it rests on the perforated section 14. These solid materials can also be lifted over divider 16 and dropped through opening 15.

After the purge and unwanted solid materials have been removed from the meat, it can be placed on a counter or block for further handling.

The waste transfer device 10 as illustrated in the drawings in preferably vacuum molded from sheet plastic material. However, it is to be understood that the device can be made from any suitable plastic or metal material, using appropriate fabrication and/or molding techniques.

When used in meat cutting operations, this device assists in keeping meat purge off the floor and cutting tables. Removing the purge before cutting meat increases its case life and reduces possibilities of bacterial contamination. The illustrated device provides a cleaner and safer working environment for the persons handling the meat and decreases chances of slips and falls.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A waste transfer device for supporting objects across an open container while providing access to the interior of the container for facilitating drainage of liquids and disposal of solids associated with the objects as they are being manually handled, the waste transfer device comprising:

an upright wall structure dimensioned to fit within an upper opening across a container;

a surrounding ledge protruding outwardly from the upright wall structure, the ledge being adapted to rest upon the container while locating the upright wall structure within its upper opening;

a transverse wall extending across the upright wall structure;

the transverse wall including a perforated section to provide support for objects while permitting drainage of fluids into the interior of the container and a discharge opening through which discarded solids can be directed into the interior of the container, the perforated section and the discharge opening of the transverse wall being arranged side-by-side within the area bounded by the upright wall structure; and a solid divider extending upward from the transverse wall and across the upright wall structure at a position located between the perforated section and the discharge opening of the transverse wall.

2. The waste transfer device of claim 1, wherein the divider has an upper edge coplanar with the ledge.

3. The waste transfer device of claim 1, wherein the perforated section of the transverse wall is substantially horizontal.

4. The waste transfer device of claim 1, wherein the ledge includes an upper surface that is dished inwardly toward the upright wall structure.

5. The waste transfer device of claim 1, further comprising:

an upwardly extending flange extending continuously about the periphery of the ledge.

6. A sanitary meat purge eliminator for supporting prepackaged meat across an open barrel while providing access to the interior of the barrel for facilitating drainage of liquid purge and disposal of solid packaging and trimmed waste associated with the meat as it is being manually handled, the sanitary meat purge eliminator comprising:

a circular upright wall having outer transverse dimensions sized to fit into an opening across the top of an upright barrel, the circular upright wall including parallel upper and lower circular edges;

a surrounding ledge intersecting and protruding transversely outward from upper circular edge of the upright wall to rest upon the top of a barrel while locating the upright wall structure within its opening;

a lower transverse wall extending across the lower circular edge of the upright wall;

the lower transverse wall including a perforated section partially bounded by the lower circular edge of the upright wall to provide support for prepackaged meat while permitting drainage of purge liquids associated with the prepackaged meat into the interior of the barrel and a discharge opening, also partially bounded by the lower circular edge of the upright wall, through which discarded packaging and solid trim can be directed into the interior of the barrel.

7. The sanitary meat purge eliminator of claim 6, wherein the perforated section and discharge opening of the transverse wall are each elevationally recessed beneath the elevation of the ledge.

8. The sanitary meat purge eliminator of claim 6, wherein the perforated section and discharge opening of the transverse wall are coplanar and located at an elevation beneath the elevation of the ledge.

9. The sanitary meat purge eliminator of claim 6, wherein the perforated section and discharge opening of the transverse wall are coplanar and located at an elevation beneath the elevation of the ledge, the sanitary meat purge eliminator further comprising:

an upright divider interposed between the perforated section and the discharge opening.

10. The sanitary meat purge eliminator of claim 6, wherein the perforated section and discharge opening of the transverse wall are coplanar and located at an elevation beneath the elevation of the ledge, the sanitary meat purge eliminator further comprising:

a solid divider extending upward from the lower transverse wall and across the circular upright wall at a position located between the perforated section and the discharge opening.

11. The sanitary meat purge eliminator of claim 6, wherein the perforated section and discharge opening of the transverse wall are coplanar and located at an elevation beneath the elevation of the ledge, the sanitary meat purge eliminator further comprising:

a solid divider extending upward from the lower transverse wall and across the circular upright wall at a position located between the perforated section and the discharge opening;

the divider having an upper edge coplanar with the ledge.

12. The sanitary meat purge eliminator of claim 6, wherein the perforated section of the transverse wall is substantially parallel to the ledge, but elevationally offset beneath it.

13. The sanitary meat purge eliminator of claim 6, wherein the ledge includes an upper surface that is dished inwardly toward the upper circular edge of the upright wall intersected by it.

14. The sanitary meat purge eliminator of claim 6, wherein the ledge has a periphery that is substantially rectangular.

15. The sanitary meat purge eliminator of claims 6, wherein the ledge has a periphery that is substantially rectangular, the sanitary meat purge eliminator further comprising:

an upwardly extending solid flange extending continuously about the periphery of the ledge.

* * * * *